Aug. 22, 1933.    W. A. HANSEN    1,923,574
AUTOMATIC SHUT-OFF FOR FILLING SPOUTS
Filed Feb. 16, 1932
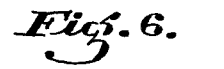
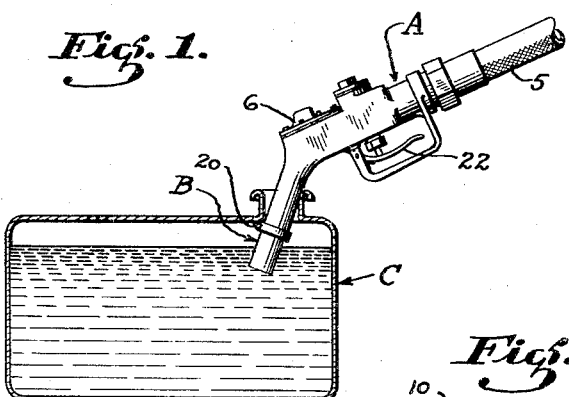
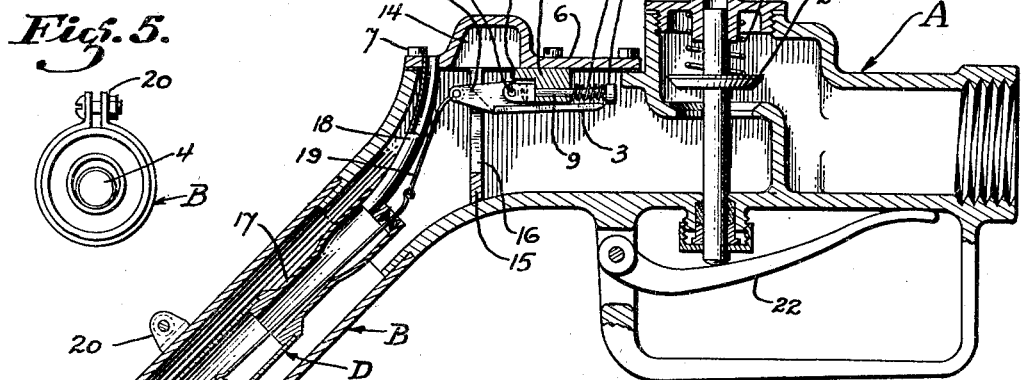
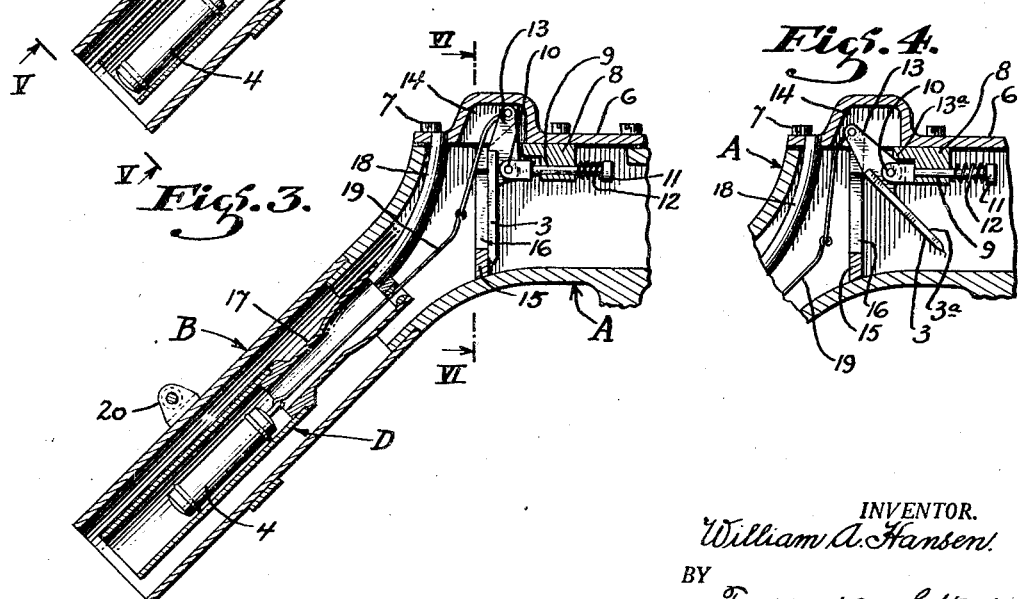
INVENTOR.
William A. Hansen
BY
Townsend and Loftus
ATTORNEYS.

Patented Aug. 22, 1933

1,923,574

UNITED STATES PATENT OFFICE 1,923,574

AUTOMATIC SHUT-OFF FOR FILLING SPOUTS

William A. Hansen, Dos Palos, Calif.

Application February 16, 1932
Serial No. 593,275

5 Claims. (Cl. 226—127)

This invention relates to filling spouts of the type applied to the end of hose lines as used in automobile service stations and the like, and especially to improvements on the structure shown in my co-pending application entitled "Automatic shut off for filling spouts", filed September 22, 1930, Serial Number 483,521.

The filling spout shown in my co-pending application, briefly stated, comprises a housing terminating in a filling spout, a manually actuated valve whereby the flow of liquid through the spout is controlled, and a float actuated valve whereby the flow of liquid is automatically shut off when the liquid in the tank to be filled reaches a predetermined level. While the structure disclosed in the application referred to is both practical and operable, actual experience has demonstrated that improvements which would insure more positive operation of the mechanism would be desirable.

The structure forming the subject matter of the present application embodies changes in construction which insure a more positive operation of the mechanism employed; the object of the present invention being that of generally improving and simplifying the construction and operation of a float and a valve mechanism in the filling spout to insure a more positive action of the automatic shut-off valve both in the closing and the opening of the same, and particularly to improve the construction and operation of the float mechanism whereby the automatic shut-off valve is actuated.

The filling spout, together with the valves and actuating mechanism contained therein, is shown by way of illustration in the accompanying drawing, in which—

Fig. 1 is a side elevation of the filling spout as attached to a hose and showing it inserted in a tank to be filled.

Fig. 2 is an enlarged central vertical longitudinal section through the filling spout.

Fig. 3 is a similar view partially broken away, showing the automatic shut off valve in closed position.

Fig. 4 is a fragmentary sectional view similar to Figs. 2 and 3, showing the automatic shut-off valve in a partially closed position.

Fig. 5 is an end view of the discharge end of the filling spout taken on line V—V of Fig. 2.

Fig. 6 is a cross section taken on line VI—VI of Fig. 2.

Referring to the drawing in detail and particularly Figs. 1 and 2, A indicates a housing which terminates in a filling spout generally indicated at B. Mounted within the housing is a valve 2 whereby the flow of liquid through the housing and spout is manually controlled, and also mounted within the housing is a valve 3, which will hereinafter be referred to as an automatic shut-off valve, as it is automatically closed and opened by means of a float 4 in a manner hereinafter to be described.

The filling spout here illustrated is particularly intended for automobile service stations and, as such, is attached to a hose 5 which, in turn, is connected with a source of gasolene supply, such as a tank, pump, or the like. When the tank C of an automobile, such as illustrated in Fig. 1, is to be filled with gasolene, the spout B is inserted in the tank and the operator will operate the valve 2 thereby permitting a flow of gasolene through the hose, the housing and the spout into the tank and, when the tank is full, the valve 2 is closed. When an automobile enters a service station, the driver often specifies five gallons, ten gallons, etc. In that case, the service station operator delivers the amount specified by holding the valve 2 open until five or ten gallons have been discharged. In such cases, overflow of the tank is not apt to take place as the driver of the automobile usually knows the capacity of his tank, or in other words the amount required. There are many instances, however, in which an automobile driver enters a service station and merely requests that the tank be filled. In that case the service station operator will not know how many gallons are in the tank, nor will he know the capacity. Hence, it is up to him to carefully watch as he is filling the tank so that overflow will not take place, even though the service station be well lighted the filling spout substantially fills the filling opening of the tank, hence letting in so little light that it is almost impossible for the operator to tell when the tank is full and the result is an overflow with accompanying waste and fire hazard. This difficulty has been obviated entirely in the present instance by providing the automatic shut-off valve 3. This is constructed and operates as follows:

Formed in the housing just forwardly of the valve 2 is an opening which is closed by means of a cover plate 6. This cover plate is secured to the housing by screws or bolts, such as indicated at 7 and it forms a support for the automatic shut-off valve 3 and the mechanism whereby it is actuated. The plate 6 has a lug 8 formed on the lower side which carries a rod 9 on one end of which the automatic shut-off valve 3 is pivotally mounted as indicated at 10. The rod is provided with a head member 11 at the opposite end and a spring 12 is interposed between the head and the lug 8 to normally maintain the rod and the valve in the position shown in Fig. 2. The valve 3 is provided with a lever extension 13 and this is adapted to enter a pocket or enlargement 14 formed on the plate 6 when the valve swings to closed position, as shown in Fig. 3.

The plate also carries a substantially rectangular shaped frame 15 in which is formed a central opening 16, the frame 15 forming a seat for the valve 3 when it assumes closed position. The frame 15 or valve seat member, together with the lug 8, may be formed integral with the plate 6, or otherwise secured thereto, so as to simplify the construction and also to permit removal of the valve 3 and the mechanism whereby it is actuated as will hereinafter be described. The frame 15, or in other words the valve seat member, fits the interior passage or upper end of the spout B rather poorly. That is, no snug fit is made as leakage of fluid around said frame and around the upper end of the valve through the pocket 14 is desired to permit automatic opening of the valve a predetermined period after it has been automatically closed, as fluid is trapped between the valves 2 and 3 when the valve 3 is automatically closed and this fluid should be drained through the spout B into the tank C before the filling spout is removed.

In order that the valve 3 may be automatically actuated when the liquid level in the tank C reaches a predetermined point of elevation within the tank, float 4 has been provided. The float is mounted within a tubular housing generally indicated at D. This housing is contracted near its upper end, as shown at 17, and it is supported by the plate 6 through means of a venting tube 18. The tube D forms a guard or housing for the float and it also forms a guide for a flexible wire connection 19 which connects the float and the lever arm 13 of the valve 3.

In actual operation when a tank, such as indicated at C, is to be filled, the spout is inserted in the tank as shown in Fig. 1 and an adjustable lug 20 formed on the spout engages the inner lower end of the filling opening, thus maintaining the spout at a predetermined elevation with relation to the top of the tank. When the spout has been inserted, the attendant or operator of the service station merely pulls upwardly on a lever, such as indicated at 22. In so doing, he raises the valve 2 from its seat and compresses a spring 2a. The automatic shut-off valve will, in this instance, be open and the liquid will have a free flow through the hose past the valve and out through the spout into the tank. As the liquid fills the tank, the liquid level will finally reach the elevation shown in Fig. 1, and as such, it is obvious that liquid will enter the tube D and thereby cause the float 4 to rise upwardly therein, and the moment the float starts upwardly the movement will be transmitted through the linkage to the valve 3. This will, accordingly, swing about its pivot 10 and, the moment it swings a slight distance, its upper surface 3a, see Fig. 4, will be presented on an angle to the liquid flowing through the housing and spout and, as such, will be deflected and carried by the flowing liquid to assume the closed position shown in Fig. 3. The moment the valve 3 is swung from the position shown in Fig. 2 in a downward direction, it is rapidly and almost instantly closed, as the flow of the liquid through the filling spout is rapid, the speed of the closing movement of the valve 3 will be in actual practice so great as to cause the valve 3 to close with a decided click that can be both heard and felt by the attendant. The moment he hears or feels this click he merely releases the handle 22 and the valve 2 will accordingly close due to the action of spring 2a. Liquid is now trapped in the housing between the valves 2 and 3 and this liquid should be drained off into the tank C as quickly as possible. This is accomplished automatically as leakage of fluid around the frame or valve seat member 15 and around the upper end of the valve will rapidly take place and the moment the slightest quantity of liquid is released, pressure on the valve 3 is released, and as this is under all conditions urged to open position by means of the spring 12, the spring 12 and float 4 will return the valve to full open position and thus permit the trapped liquid to drain into the tank.

The operation of automatically opening the shut-off valve after it has been automatically closed by action of the float 4 is very rapid. In fact, so rapid that when the attendant hears or feels the click of the closing of the valve 3, he releases the valve handle 22 permitting the valve 2 to close and he can almost immediately pull the spout out of the tank, as valve 3 will begin to open and thereby permit the liquid to drain out as he is pulling the spout out of the tank. The operator or attendant does not have to rely on hearing or feeling the click of the shut-off valve when it closes. He may merely watch the gasolene in the visible tank or gauge, or the dial indicator, and when either comes to a stop he knows that the tank is full and will accordingly release the valve handle 22 and thereby close valve 2.

By referring to Fig. 2, it will be noted that the automatic shut-off valve 3 is shown in full open position, and when this position is assumed valve 3 assumes a slightly inclined position, the angle of incline being such that the rapid flow of liquid through the housing and spout will cause planing of the valve, thereby assisting in maintaining it in open position. The moment, however, valve 3 is swung about its pivot to assume an opposite inclined position the valve is almost instantly closed due to the velocity and force of the flowing liquid. The valve 3, besides being pivoted as indicated at 10 to move to or away from its seat, is also longitudinally movable with relation to its seat to a slight extent, that is, during closing of the valve, lever 13 engages a shoulder 13a thereby causing longitudinal movement of the rod 9 and compression of the spring 12 and during this longitudinal movement the valve closes with relation to its seat, both by pivotal movement and by longitudinal movement, as the valve is bodily moved toward its seat. It is in this manner that compression of spring 12 is obtained and it, furthermore, provides lever action which permits a spring of very slight tension to be employed. The tube D which forms a guide and a housing for the float 4 is one of the important features of the present invention.

First of all it forms a guide and support for the float; secondly, it functions as a guard for the same by enclosing the float, that is, the float 4 is in no way affected by the downward rush of liquid through the spout when the tank is being filled. If it should be subjected to the velocity of the discharging liquid, it would tend to maintain the valve 3 in an open position. This is one of the difficulties encountered in the valve structure shown in the co-pending application, previously referred to, which has been entirely overcome by enclosing the float in the tube D here shown. The only time liquid will enter this tube is when a predetermined liquid level is reached in the tank. The liquid slowly rises in the tube D as the predetermined liquid level is being reached and, as such, causes positive movement of the float in an upward direction within the tube. The tube indicated at 18 functions as a vent for the tube D so as to permit the liquid to rise therein, and it also functions as a support therefor. The entire mechanism, to-wit, the tube D, the float mounted therein, the venting tube 18, the valve seat member 15, the valve 3, the spring 12 whereby it is actuated, are all supported by the cover member 6. Hence, all this mechanism may be removed as a unit when the cover plate is removed and repair or inspection of the mechanism is thus easily and readily accomplished.

By providing an adjustable lug 20 on the spout it is possible to automatically close valve 3 when the tank is within one gallon of being full. If one-quarter or any fraction of a gallon is left when valve 2 is closed the attendant will lift the spout a little and again open valve 2, thus permitting filling of the tank to an even gallonage. If the public should become educated to pay for a fraction of a gallon, lug 20 can be set to completely fill the tank and then automatically shut off.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A device of the character described comprising a housing terminating in a filling spout, said spout and housing having a flow passage formed therein for the passage of a liquid, a valve pivotally mounted in the flow passage and adapted when closed to stop a liquid flow through the passage, spring actuated means normally maintaining the valve in an open position and on a slight angle with relation to the direction of liquid flow through the passage so that the flow of liquid will act to maintain the valve in open position, a float in the spout and a connection between the float and the valve whereby movement of the float in one direction is transmitted to swing the valve about its pivot to an angular position opposite to that normally assumed when opened so that the flowing liquid may act on the valve to swing the same to a closed position.

2. A device of the character described comprising a housing terminating in a filling spout, a valve pivotally mounted in the housing, a tubular guide housing within the spout open at its lower end and provided with a vent at its upper end, a float slidably mounted in the tubular guide housing, and a connection between the float and the valve whereby movement of the float is transmitted to swing the valve about its pivot to open or close the same.

3. A device of the character described comprising a housing terminating in a filling spout, said housing having a flow passage formed therein and an opening, a plate forming a closure for said opening, a valve seat member carried by the plate and having an opening formed therein for the flow of liquid, said valve seat member loosely fitting the flow passage to permit leakage around the same, a pivotally mounted valve on the plate and movable into and away from the valve seat member, a tubular guide housing carried by the plate, a float in said tube, and a connection between the float and the valve whereby movement of the float is transmitted to open or close the valve.

4. A device of the character described comprising a housing terminating in a filling spout, said housing having a flow passage formed therein and an opening, a plate forming a closure for said opening, a valve seat member carried by the plate and having an opening formed therein for the flow of liquid, said valve seat member loosely fitting the flow passage to permit leakage around the same, a pivotally mounted valve on the plate and movable into and away from the valve seat member, a tubular guide housing carried by the plate, a float in said tube, said tube being closed at its upper end, a link projecting through the closed end of the tube and forming a connection between the float and the valve, and a venting tube connected with the closed end of the guide tube.

5. A device of the character described comprising a housing terminating in a filling spout, said housing having a flow passage formed therein and an opening, a plate forming a closure for said opening, a valve seat member carried by the plate and having an opening formed therein for the flow of liquid, said valve seat member loosely fitting the flow passage to permit leakage around the same, a lug on the plate, a rod slidably mounted in the lug, a spring interposed between the lug and one end of the rod, a flat valve member pivotally mounted on the opposite end of the rod and movable to and away from the valve seat member, said valve normally assuming an open position and on a slight angle with relation to the direction of liquid flow through the housing so that the liquid will exert a pressure to maintain the valve open, a float in the spout and a connection between the float and the valve whereby movement of the float in one direction is transmitted to swing the valve about its pivot to an opposed angular position where the liquid will exert pressure to close the valve.

WILLIAM A. HANSEN.